United States Patent
Ookita

[11] Patent Number: 5,905,364
[45] Date of Patent: May 18, 1999

[54] RAPID BATTERY CHARGER WITH CHARGE CONTROLLING CAPABILITY DEPENDING ON OVERVOLTAGE OF THE BATTERY

[75] Inventor: Hirotaka Ookita, Nagoya, Japan

[73] Assignee: Brother Kogyo Kabushiki Kaisha, Nogoya, Japan

[21] Appl. No.: 08/803,022

[22] Filed: Feb. 19, 1997

[30] Foreign Application Priority Data

Feb. 20, 1996 [JP] Japan .................................... 8-031925

[51] Int. Cl.⁶ .......................... H01M 10/44; H01M 10/46
[52] U.S. Cl. .......................................................... 320/141
[58] Field of Search ................................... 320/5, 14, 21, 320/22, 29, 30, 31, 32, 39, 141, 145, 155, 156, FOR 104, FOR 113, FOR 120, FOR 121, FOR 128, FOR 129, FOR 130, FOR 131, FOR 138

[56] References Cited

U.S. PATENT DOCUMENTS

| | | | |
|---|---|---|---|
| 3,863,129 | 1/1975 | Yamauchi | 320/31 |
| 4,356,481 | 10/1982 | Kuki | 340/636 |
| 5,350,996 | 9/1994 | Tauchi | 320/22 |
| 5,408,170 | 4/1995 | Umetsu et al. | 320/39 |
| 5,589,755 | 12/1996 | Kaite et al. | 320/21 |
| 5,596,259 | 1/1997 | Mino et al. | 320/21 |

FOREIGN PATENT DOCUMENTS

JP-A-6-121468   4/1994   Japan .

*Primary Examiner*—Edward Tso
*Attorney, Agent, or Firm*—Oliff & Berridge, PLC

[57] ABSTRACT

A rapid battery charger uses current pulses to quickly charge secondary batteries of various types having a wide variety of charging characteristics. When the current pulse is paused, the voltage across the secondary battery is measured at two different times; the difference in the two voltages is compared with a reference value; and the current is adjusted according to the result of the comparison, thus preventing the generation of gas within the secondary battery.

14 Claims, 5 Drawing Sheets

RAPID BATTERY CHARGER WITH CHARGE CONTROLLING CAPABILITY DEPENDING ON OVERVOLTAGE OF THE BATTERY

BACKGROUND OF THE INVENTION

1. Field of the Invention

The present invention relates to a battery charger for rapidly charging a secondary battery

2. Description of the Prior Art

A conventional rapid battery charger as described in Japanese Laid-Open Patent Publication No. HEI-6-121468 supplies a large current to a secondary battery during the initial stage of charging. During the charging process, a CPU periodically sets the charging current to zero (off) and measures the open-circuit voltage of the secondary battery. The open-circuit voltage is then compared with a previously set reference voltage. If the open-circuit voltage is determined to exceed the reference voltage, then the current used for charging is changed to a lower value, signifying a progression in the charging process.

This technology reduces the current before gas is produced, allowing the battery to be charged to a high voltage level while preventing the generation of gas which may otherwise be generated if the battery is charged with a large current. Gas is produced when the voltage across the secondary battery exceeds a certain value.

When a secondary battery is being charged, the voltage across the battery increases due to the current applied to the battery and also to increases in the amount of electrical charges stored in the battery. The voltage eventually reaches a point at which gas is generated within the battery. In rapid charging, overvoltage also rises considerably due to the large current that is flowed through the secondary battery. To reduce this overvoltage, the current has conventionally been reduced during the charging process before gas is generated.

With another type of battery charger, the open-circuit voltage of the secondary battery is periodically measured during the charging process and compared with a reference voltage. The charging process is terminated at the point that the voltage exceeds the reference voltage.

The open-circuit voltage is measured when current is not being applied to the secondary battery in order to avoid ohmic dissipation from resistances in the battery leads and terminal contacts and from internal resistance of the battery.

A battery charger as described above, however, requires that a different voltage be set for each type of secondary battery, because the overvoltages that result from a charging current are not the same for every type of secondary battery. Such a requirement makes operating the battery charger more complicated.

If the reference voltage is fixed at a certain value designed for one type of battery but used to represent all types of batteries the expected charging results will not be obtained with many batteries, because charging characteristics vary widely from battery to battery. Fixing the reference voltage in this way may result in low charges, invite the generation of excessive gas, and the like.

SUMMARY OF THE INVENTION

In view of the foregoing, it is an object of the present invention to provide a rapid battery charger that removes the necessity to set a reference voltage for each secondary battery and that reduces the variations in charging characteristics.

To achieve the above and other objects, one aspect of the present invention provides a rapid battery charger that includes a current source, a current switching circuit a timing setting means, voltage detecting means, voltage differential computing means, comparison means, and current level controlling means. The current source generates a current having a level. The current switching circuit is connected to the current source and turns the current on and off to produce current pulses occurring at a predetermined frequency. The current pulses are supplied to a battery to be recharged for charging the same. Each of the current pulses is on for a first duration of time and off for a second duration of time. The timing setting means is provided for setting a first timing and a second timing in the second duration of time of each of the current pulses. The first timing is set immediately after each of the current pulses is rendered off, and the second timing is set after the first timing.

The voltage detecting means detects a first voltage across the battery at the first timing and a second voltage across the battery at the second timing. The voltage differential computing means computes a difference between the first voltage and the second voltage and outputs a voltage differential representative of the difference therebetween.

The comparison means compares the voltage differential output from the voltage differential computing means with a reference value and outputs a comparison output. The current level controlling means changes the level of the current in response to the comparison output when the comparison output represents that the voltage differential has exceeded the reference value, the current level controlling means lowers the level of the current.

Reference value changing means is further provided for changing the reference value in response to the comparison output. When the comparison output represents that the voltage differential has exceeded the reference value, the reference level changing means changes the reference value to be compared with the voltage differential by the comparison means.

Specifically, when the comparison output represents that the voltage differential has exceeded the reference value, the current level controlling means lowers the level of the current and the reference value changing means changes the reference value to be compared with the voltage differential by the comparison means.

An initial current level setting means is further provided for setting an initial level of the current to be generated from the current source. Also, an initial reference value setting means is provided for setting an initial reference value to be initially compared with the voltage differential.

In a preferred embodiment, the current level controlling means changes the level of the current in three stages including a first current level, a second current level lower than the first current level, and a third current level lower than the second current level. The initial current level setting means sets the first current level. The reference value changing means changes the reference value in three stages including a first reference value, a second reference value, and a third reference value which are determined depending on the level of the current changed by the current level controlling means and the property of the battery. The initial reference value setting means sets the first reference value. The current level changing means changes the first current level to the second level and concurrently the reference value changing means changes the first reference value to the second reference value when the comparison output represents that the voltage differential has exceeded the first reference value. As the charging progresses, the current level changing means changes the second current level to the third level and concurrently the reference value changing means changes the second reference value to the third reference value when the comparison output represents that the voltage differential has exceeded the second reference value.

Termination means is further provided for terminating charging the battery. The termination means terminates charging the battery when the comparison output represents that the voltage differential has exceeded the third reference value. Alerting means is also provided for alerting that charging the battery has terminated when the terminating means has terminated charging the battery. The alerting means may be a buzzer or a display.

According to another aspect of the invention, there is provided a rapid battery charger that includes a current source, a current switching circuit, overvoltage detecting means, comparison means, and current level controlling means. The current source generates a current having a level. The current switching circuit is connected to the currant source and turns the current on and off to produce current pulses occurring at a predetermined frequency. The current pulses is supplied to a battery to be recharged. The overvoltage detecting means detects an overvoltage of the battery detected during the off duration of the current pulse. The overvoltage is representative of a voltage applied to the battery in excess of a battery voltage determined based on electrical charges stored in the battery. The overvoltage detecting means outputs an output representative of the over voltage. The comparison means compares the output from the overvoltage detecting means with a reference value and outputs a comparison output. The current level controlling means changes the level of the current in response to the comparison output.

When the comparison output represents that the overvoltage has exceeded the reference value, the current level controlling means lowers the level of the current.

Reference value changing means is further provided for changing the reference value in response to the comparison output. When the comparison output represents that the overvoltage has exceeded the reference value, the reference level changing means changes the reference value to be compared with the overvoltage by the comparison means.

Specifically, when the comparison output represents that the overvoltage has exceeded the reference value, the current level controlling means lowers the level of the current and the reference value changing means changes the reference value to be compared with the overvoltage by the comparison means.

Initial current level setting means is further provided for setting an initial level of the current to be generated from the current source. Also, an initial reference value setting means is provided for setting an initial reference value to be initially compared with the overvoltage.

In a preferred embodiment, the current level controlling means changes the level of the current in three stages including a first current level, a second current level lower than the first current level, and a third current level lower than the second current level. The initial current level setting means sets the first current level. The reference value changing means changes the reference value in three stages including a first reference value, a second reference value, and a third reference value which are determined depending on the level of the current changed by the current level controlling means and the property of the battery. The initial reference value setting means sets the first reference value.

The current level changing means changes the first current level to the second level and concurrently the reference value changing means changes the first reference value to the second reference value when the comparison output represents that the overvoltage has exceeded the first reference value. The current level changing means changes the second current level to the third level and concurrently the reference value changing means changes the second reference value to the third reference value when the comparison output represents that the overvoltage has exceeded the second reference value.

Termination means is further provided for terminating charging the battery, which terminates when the comparison output represents that the voltage differential has exceeded the third reference value. Alerting means is further provided for alerting that charging the battery has terminated when the terminating means has terminated charging the battery.

In accordance with still another aspect of the present invention, there is provided a method of rapidly charging a rechargeable battery. The method includes the following steps.

In step (a), current pulses to be applied to the battery are set, wherein each of the current pulses has a level, an on duration from a rising edge to a falling edge, and an off duration from the falling edge to a subsequent rising edge of a subsequent current pulse. In step (b), a reference value is set. In step (c) the current pulses are applied to the battery. In step (d), a first voltage across the battery is detected at a first timing set immediately after the falling edge of each of the current pulses. In step (e), a second voltage across the battery is detected at a second timing set after the first timing in the off duration of each of the current pulses. In step (f), a difference between the first voltage and the second voltage is computed to obtain a voltage differential representative of the difference therebetween. In step (g), the voltage differential is compared with the reference value set in step (b) and a comparison output is output. In step (h), when the comparison output represents that the voltage differential has exceeded the reference value set in step (b), the level of the current pulses is lowered and the lower level current pulses are applied to the battery. In step (i), the reference value set in step (b) is changed to a predetermined different value. In step (j), steps (d) through (i) are repeated for a predetermined number of times and then charging the battery is terminated. It is preferable that steps (d) through (i) are repeated two times.

BRIEF DESCRIPTION OF THE DRAWINGS

The particular features and advantages of the invention as well as other objects will become apparent from the following description taken in connection with the accompanying drawings, in which.

DETAILED DESCRIPTION OF THE PREFERRED EMBODIMENT

A preferred embodiment of the present invention will be described while referring to the accompanying drawings. First, the structure of a rapid battery charger according to the preferred embodiment of the present invention will be described with reference to FIG. 1.

Figure 1:
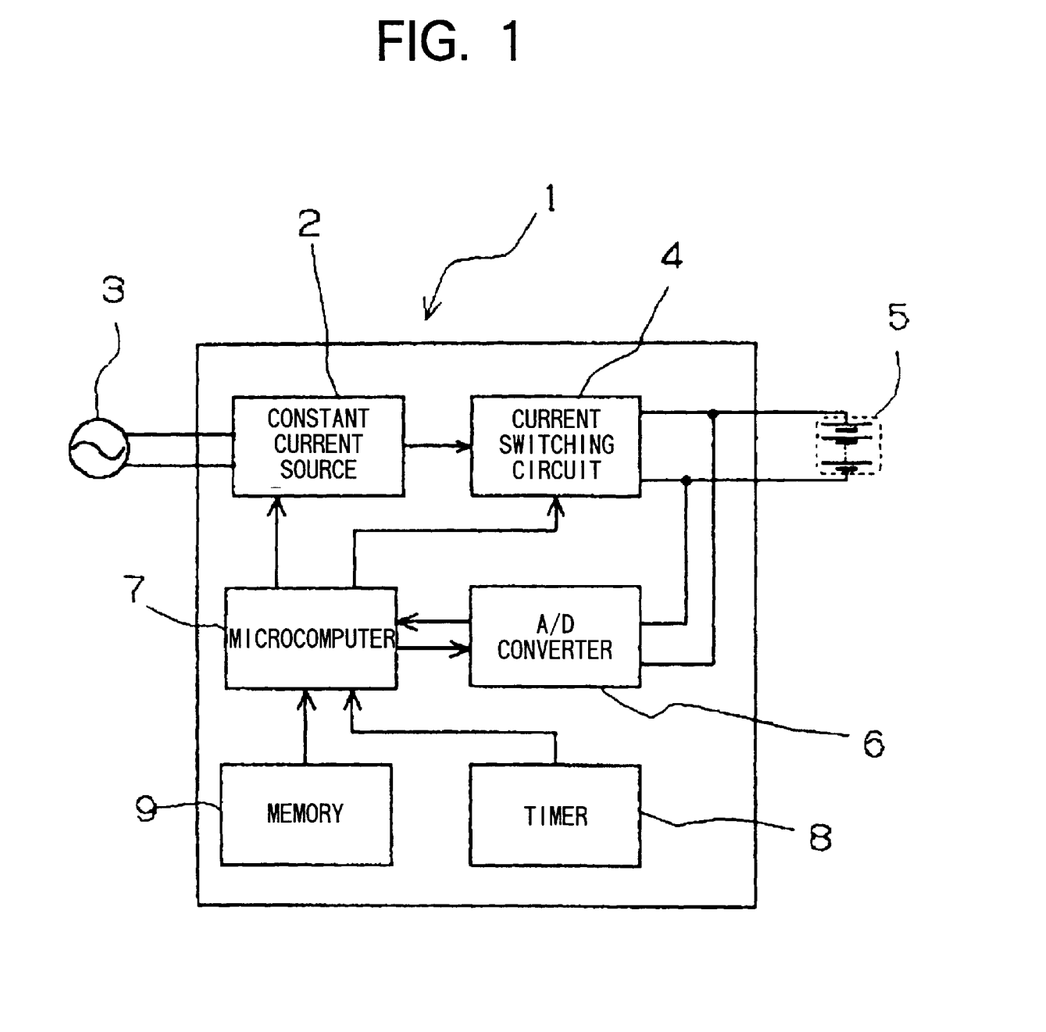
FIG. 1 is a block diagram showing a rapid battery charger of the present invention.

As shown in FIG. 1, a rapid battery charger 1 of the preferred embodiment is provided with a constant current source 2. An alternating power supply 3 is connected to the constant current source 2. The output of the constant current source 2 is applied to a current switching circuit 4. The current switching circuit 4 applies current pulses of a predetermined frequency to a secondary battery 5 to be recharged by turning the current of the constant current source 2 on and off.

The current switching circuit 4 is constructed from a transistor switch as is well known in the art and is turned on and off by a microcomputer 7 to be described later, forming current pulses. In other words, the current switching circuit 4 is configured to introduce a charging current at a specified value into the secondary battery 5 when in the on duration and to stop the flow of the charging current when in the off duration. The constant current source 2, also well known in the art, is able to output a constant current of a level between zero and the predetermined maximum current that can flow in the battery in response to an output signal fed from the microcomputer 7.

The secondary battery 5 can be detachably loaded between the positive and negative terminals of the current switching circuit 4. An A/D (analog-to-digital) converter 6 is connected between the positive electrode (the positive terminal of the secondary battery 5) and the negative electrode (the negative terminal of the secondary battery 5) of the current switching circuit 4 An output terminal of this A/D converter 6 is connected to a signal input terminal of the microcomputer 7. The A/D converter 6 converts the terminal voltage across the secondary battery 5 into a digital signal in response to a measurement signal received from the microcomputer 7.

The microcomputer 7 is configured to turn off the current switching circuit 4, shutting off the current supplied from the constant current source 2, and to then measure the voltage across the terminals of the secondary battery 5 while the current pulse is off. A timer 8 is connected to the microcomputer 7 for measuring two delay times starting from the falling edge of the pulse. After each delay time has elapsed, the microcomputer 7 measures the terminal voltage of the secondary battery 5. A memory 9 is connected to the microcomputer 7 for storing reference values, which will be explained later.

Next, the rapid battery charger 1 of this embodiment will be described with reference to FIGS. 1 through 4.

Figure 2:
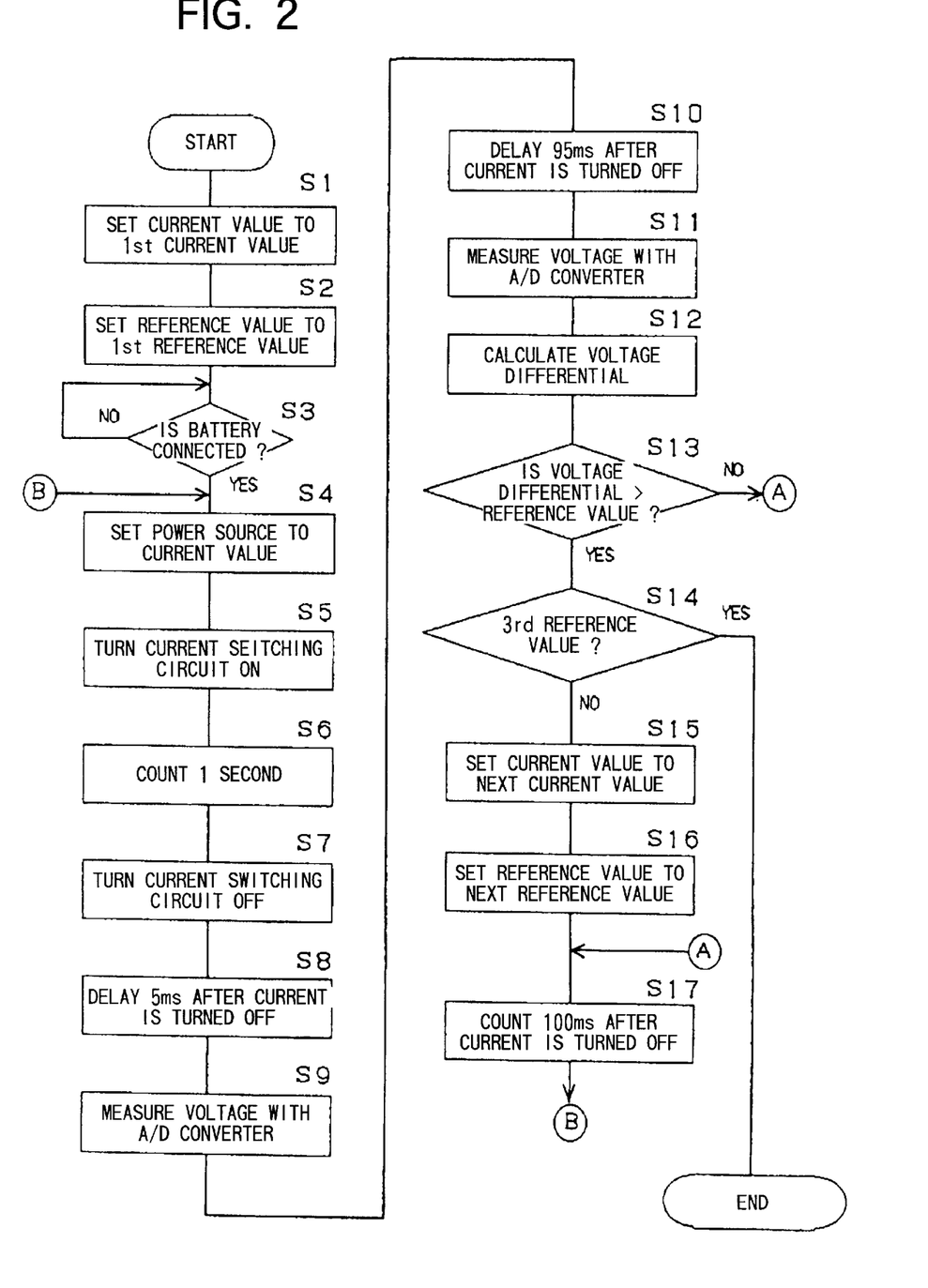
FIG. 2 is a flowchart showing operations of a rapid battery charger of the present invention.

When the rapid battery charger 1 is turned on, the current value to be supplied from the constant current source 2 is initialized to the first current value (S1) and the reference value is initialized to the first reference value (S2). When the secondary battery 5 is connected to the rapid battery charger 10 the A/D converter 6 detects the battery connection (S3: yes) and begins the charging process.

First, the microcomputer 7 sends a current value setting instruction to the constant current source 2. Since the current value was initialized to the first current value which may be for example, 10C, an instruction to output the first current value is sent to the constant current source 2 (S4) and the constant current source 2 outputs the specified constant current to the current switching circuit 4. The symbol C of 10C corresponds to a current that can charge the rated capacity of the secondary battery 5 in one hour. Therefore, if the rated capacity of the secondary battery 5 is 500 mAh, then the value of the first current value (10C) would be equivalent to 5 A.

Next, the microcomputer 7 instructs the current switching circuit 4 to turn on the current (S5). As a result, a current value of 10C flows to the secondary battery 5. The microcomputer 7 waits for one second (S6), counted by the timer 8, after the current has been turned on and then tells the current switching circuit 4 to turn off the current to the secondary battery 5 (S7). In short, the secondary battery 5 is charged at a constant current value of 10C for intervals of one second controlled by the operations of the microcomputer 7 and the current switching circuit 4.

Next, the microcomputer 7 waits a first delay of 5 ms (S8), counted by the timer 8, from the point that the current switching circuit 4 was sent an off command. After the first delay, the terminal voltage of the secondary battery 5 input to the A/D converter 6 is converted to a corresponding digital signal by the A/D converter 6 and read by the microcomputer 7 (S9).

Next, the microcomputer 7 waits for a second delay time of 95 ms (S10), counted by the timer 8, from the point that the current switching circuit 4 was sent an off command. After the second delay, the terminal voltage of the secondary battery 5 input to the A/D converter 6 is again converted to a corresponding digital signal by the A/D converter 6 and read by the microcomputer 7 (S11).

Next, the microcomputer 7 calculates the difference between the voltage V1 read after the first delay and the voltage V2 read after the second delay (S12) and compares this voltage differential (V1−V2) with the value of the first reference value (S13).

At the beginning of the charging process, however, the voltage differential (V1−V2) is less than the first reference voltage (S13: no). Therefore, the current value setting instruction is sent again to the constant current source 2 after a 100-ms delay from the point at which the microcomputer 7 sent an off command to the current switching circuit 4 (S17). In this case, the first current value is again sent from the constant currant source 2, as the established current value has not changed, and, as above, a constant current value of 10C is flowed through the secondary battery 5.

Figure 3:
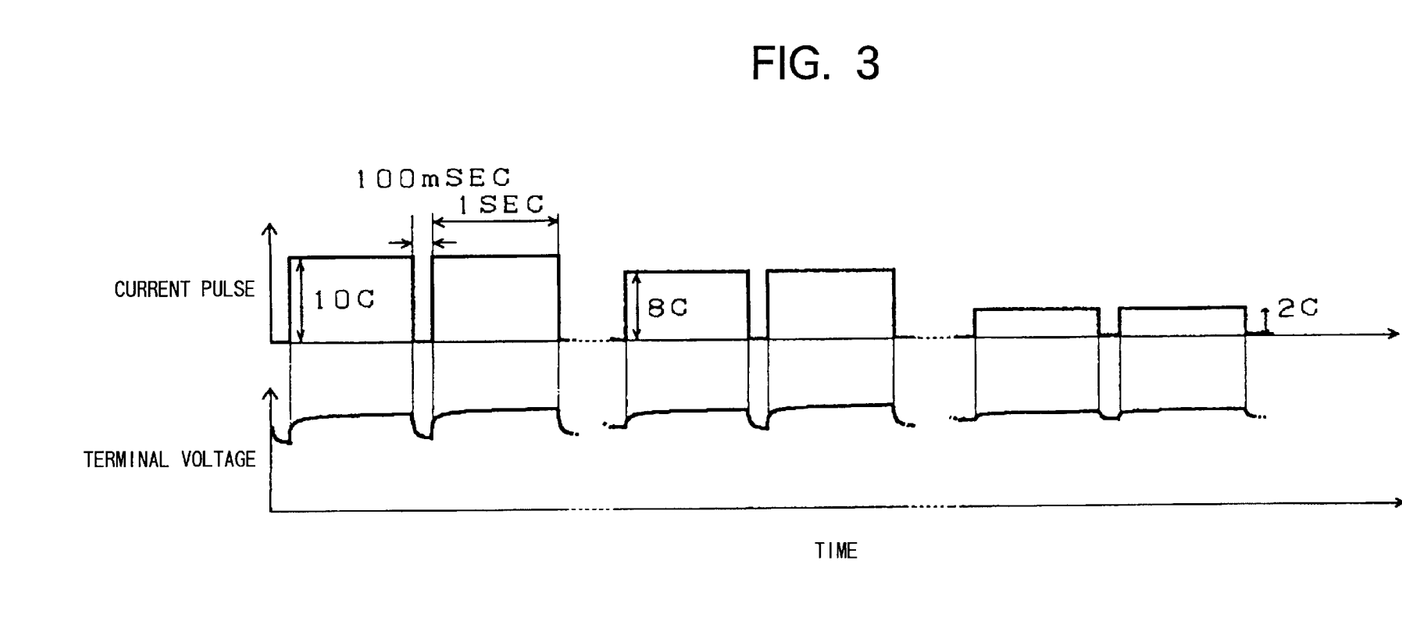
FIG. 3 is a graph showing the current pulse during operation and the terminal voltage of a secondary battery over time.

The microcomputer 7 repeats the operations shown in S4—S13 and S17 until the voltage differential (V1−V2) mentioned above exceeds the first reference voltage. In order to accomplish this, a periodic pulse current is applied to the secondary battery 5. The pulse current has a current level of 10C and is on for one second and off for 100 ms, as shown in FIG. 3. For convenience sake, only two pulses of the current are shown in FIG. 3, but about 500 pulses would be applied in the actual operation.

Figure 4:
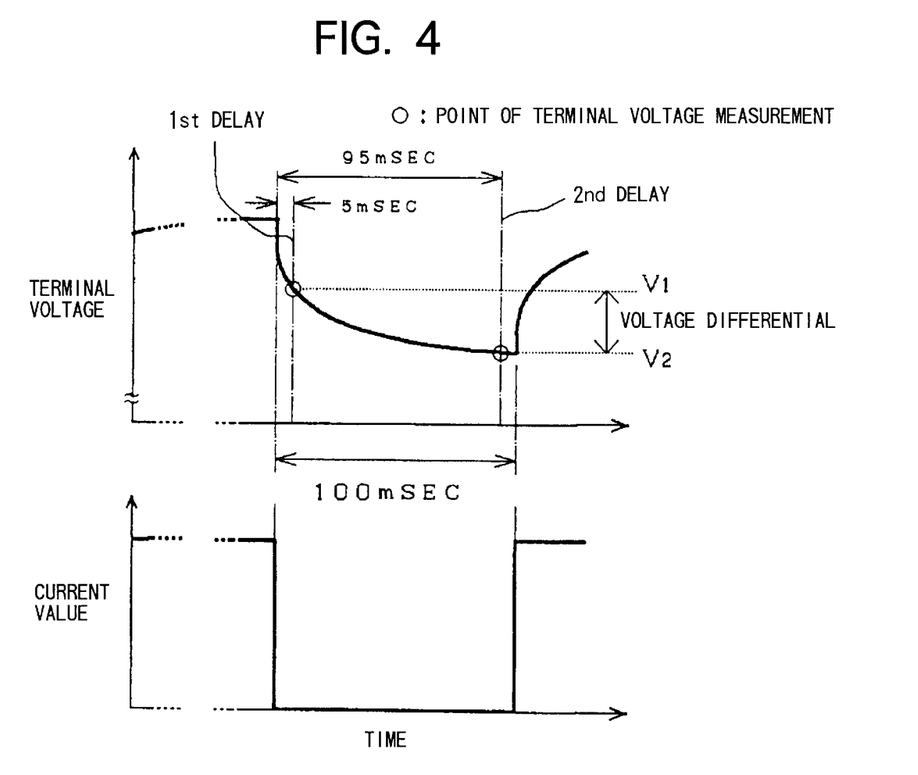
FIG. 4 contains a graph illustrating the timing of voltage measurements.

During the period that the periodic pulse current is off, the microcomputer 7 measures the terminal voltage of the secondary battery 5 using the first and second timings shown in FIG. 4.

In this embodiment, the on time of the pulse has been set to 1 second and the off time to 100 ms. However, the on time can be set freely, and the off time can be set to any value equal or greater to 100 ms.

In order to explain the relationship between the reference value and the voltage differential, changes in the current pulse and in the terminal voltage across the secondary battery 5 when the current pulse is applied will be explained next with reference to FIGS. 3 through 5.

Figure 5:
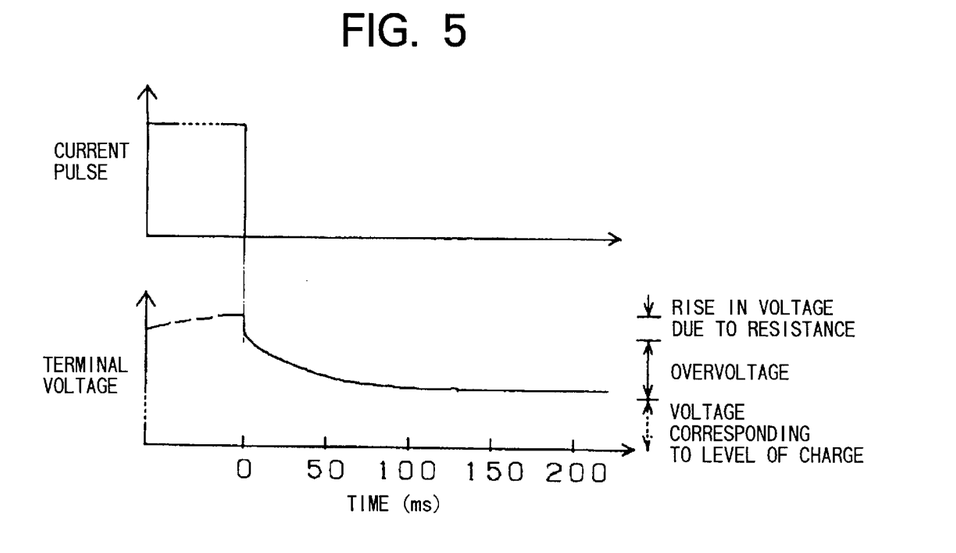
FIG. 5 is a graph showing the terminal voltage response of an ordinary secondary battery to a current pulse.

As shown in FIG. 5, when the current pulse is turned off, the terminal voltage of the secondary battery 5 instantaneously drops the amount of voltage raised due to resistance component of the battery 5. Thereafter, the overvoltage portion decreases exponentially. After a sufficient length of time, the voltage across the battery 5 will fall to the voltage defined by the charged amount in the secondary battery 5. The term "overvoltage" means the voltage that must be added in excess of the battery voltage in order to charge the secondary battery 5. Overvoltage has a close relationship to the level of current used for charging.

When a pulse is continually sent to the battery, as shown in FIG. 3, the terminal voltage rises when the current pulse is on due to resistance component of the battery 5, after which a gradual rise in overvoltage can be seen. When the pulse is off, the amount of voltage duo to resistance component of the battery 5 drops instantaneously, while the amount of overvoltage decreases slowly. However, because the charge progressed during the time the current was flowing, the terminal voltage is slightly higher than the value when the previous current pulse was applied.

The secondary battery 5 becomes charged through receiving the above current pulses repeatedly. As the charge increases, the entire voltage rises. However, when the voltage of the secondary battery 5 exceeds a certain value, gas is generated within the secondary battery 5 due to a decomposition of electrolytic solution. Thus, in order to prevent the generation of gas, it is necessary to lower the overvoltage when the current pulse is on by reducing the current.

The voltage defined by the charged capacity, as mentioned above, varies considerably among different types of batteries. When a voltage value is used as a reference value, therefore, depending on the battery type, the current might be switched even thought the overvoltage is still low, or conversely the current might not be switched even though the overvoltage has risen, inviting the generation of gas in the battery.

In the present invention, however, the voltage is measured twice when the pulse is off, as shown in FIG. 4. The change in overvoltage can be learned referring to the difference in these measurements, i.e., the voltage differential. Then, the effect on voltage changes defined by the charged capacity can be reduced, and the difference in charging operations among different types of batteries can be reduced.

In the present invention, the timing of the first voltage measurement is set to 5 ms after the current pulse is turned off, but this measurement can be taken at an even earlier time, providing the measurement is taken before overvoltage caused by the current pulse drops.

Figure 6:
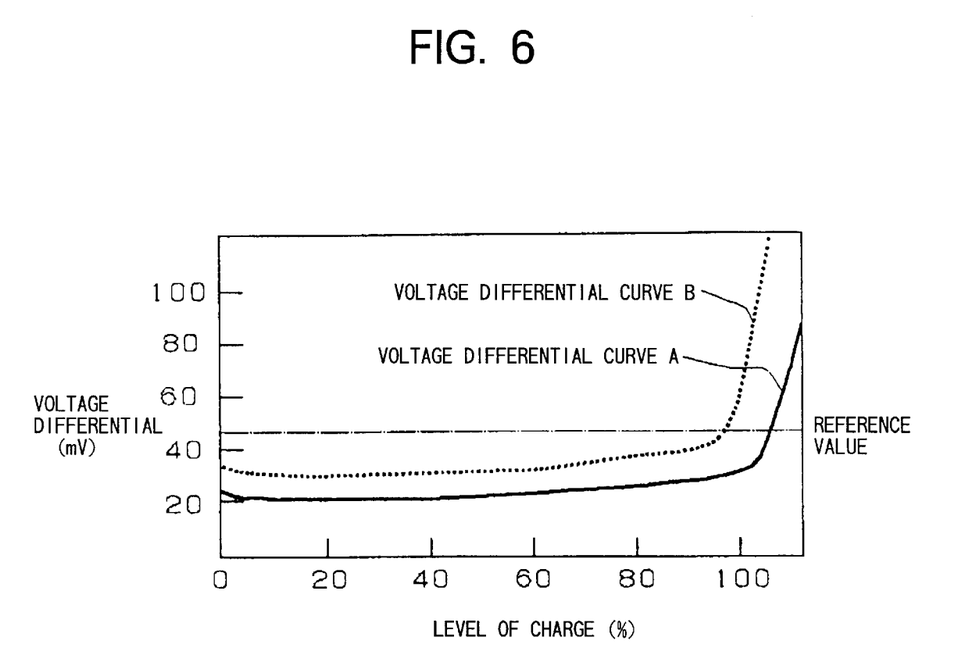
FIG. 6 is a graph showing the relationships between the level of charge and the voltage differential and between the voltage differential and the reference value.

The voltage differential of voltage V1 read after the first delay and voltage V2 read after the second delay will increase as the charge progresses, as shown in FIG. 6, and will increase abruptly when nearing the point of gas generation during the final stages of charging.

The amount of electric charges stored when the voltage differential increases abruptly and the voltage differential at that time vary according to the type of secondary battery 5 and the value of the current flowing to the secondary battery 5. Once the voltage differential begins to increase rapidly, however, very small changes in the amount of electrical charges stored cause large changes in the voltage differential.

Conversely, setting the voltage differential to a reference value will decrease the discrepancy between the charged amount at which the reference value is reached and the charged amount at which gas begins to be generated. For this reason, by setting the point to which the voltage differential increases to a reference value, it is possible to establish a common reference for the current value of the current pulse used in the various types of secondary batteries 5.

The generation of gas can be prevented by establishing reference values for the voltage differential described above in advance and storing them in the memory 9. First, the first reference value is set to the point at which the voltage differential increases abruptly, when charging with a constant current of the first current value. This first reference value is stored in the memory 9. Next, the second and third reference values are set in the same way and also stored in the memory 9. Then, by changing from one reference value to the next and switching current values at the same time, the generation of gas can be prevented.

Next, the operations of the rapid battery charger of the present invention will be described with reference to FIGS. 1 through 3.

As the charging progresses, the above-mentioned voltage differential (V1–V2) rises, eventually exceeding the first reference value (S13: yes). This indicates the end of charging by a current pulse of the first current value (10C) and signifies that, if the charging continues further, gas will be generated within the secondary battery 5. If the current value is reduced, however, it is still possible to charge the battery.

The microcomputer 7 determines whether to stop the charging process by checking if the current reference value is the third reference value (S14). Since only the first current value has ended at this point (S14: no), the current value is set to the second current value (8C) (S15), and the reference value is changed to the second reference value (S16).

After the current value has been changed to the second current value (8C) and the reference value to the second reference value, the voltage differential (V1–V2) remains for awhile beneath the second reference value (S13: no). Thus, the microcomputer 7 repeats the operations in steps S4 through S13 and S17 of FIG. 2 until the voltage differential (V1–V2) exceeds the second reference value. To accomplish this cycle, a periodic pulse current of 8C, which is on for 1 second and off for 100 ms, is applied to the secondary battery 5, as shown in FIG. 3. For convenience sake, only two pulses are shown in FIG. 3, but several hundred pulses would be consecutively applied in the actual operation.

As the charging progresses, the voltage differential of the secondary battery 5 continues to rise until the voltage differential exceeds the second reference value (S13: yes). If charging with the second current is continued beyond this point, gas will begin to develop within the secondary battery 5. Therefore, the current value must be reduced. If the current is reduced to the third current value, charging is still possible. The microcomputer 7 again determines whether to stop the charging process by checking if the current reference value is the third reference value (S14). Since the second reference value is set (S14: no), the current value is set to the third current value (2C) (S15), and the reference value is changed to the third reference value (S16).

After the current value has been changed to the third current value (2C) and the reference value has been changed to the third reference value, the voltage differential (V1–V2) remains for awhile below the third reference voltage (S13: no). Thus, the microcomputer 7 repeats the operations in steps S4 through S13 of FIG. 2 until the voltage differential (V1–V2) exceeds the third reference value. To accomplish this cycle, a periodic pulse current of 2C, which is on for 1 second and off for 100 ms, is applied to the secondary battery 5, as shown in FIG. 3. For convenience sake, only two pulses are shown in FIG. 3, but several tens of pulses would be consecutively applied in the actual operation.

As charging with a current pulse of the third current value progresses further, the voltage differential of The secondary battery 5 gradually rises until that voltage differential exceeds the third reference value (S13: yes). The third current value is set to a sufficiently smaller value compared to the first and second current values. For this reason, if the battery is charged at this current until just before gas is generated, the battery will have reached a near fully charged state. The microcomputer 7 will stop the charging process after determining that the reference value is the third reference value (S14: yes). An alarm such as a display panel or a buzzer may be used at this time to alert the user that the charging process has ended.

The reference values are determined on a battery-to-battery basis depending on the property of the battery and further on the levels of the current changed. Generally, the second reference value tends to be smaller than the first reference value, and the third reference value tends to be smaller than the second reference value.

The present invention changes the current value of a current pulse, lowering the current in three stages, from the first constant current value (10C) to the second constant current value (8C) to the third constant current value (2C). This method allows a secondary battery to be charged with a large current during the early stages of charging, when the battery voltage is low, reducing the time of charging. In the final stages of charging, the battery voltage is higher due to the increased charge level and gas can be generated easily. Thus, rapid charging to gain a sufficient amount of charge is achieved by lowering the charge current and supplementing the charge level. As long as the last current value of the supplied current pulse is the smallest, being set sufficiently small to prevent gas from being generated until the battery is fully charged, the other current values and number of varied stages can be set freely.

What is claimed is:

1. A rapid battery charger comprising:
   a current source for generating a current having a level;
   a current switching circuit connected to said current source for turning the current on and off to produce current pulses occurring at a predetermined frequency, the current pulses being supplied to a battery to be recharged, each of the current pulses being on for a first duration of time and off for a second duration of time;
   timing setting means for setting a first timing and a second timing in the second duration of time of each of the current pulses, the first timing being set immediately after each of the current pulses is rendered off and the second timing being set after the first timing;
   voltage detecting means for detecting a first voltage across the battery at the first timing and a second voltage across the battery at the second timing;
   voltage differential computing means for computing a difference between the first voltage and the second voltage and outputting a voltage differential representative of the difference therebetween;
   comparison means for comparing the voltage differential output from said voltage differential computing means with a reference value and outputting a comparison output; and
   current level controlling means for changing the level of the current in response to the comparison output.

2. The rapid battery charger according to claim 1, wherein when the comparison output represents that the voltage differential has exceeded the reference value, said current level controlling means lowers the level of the current.

3. The rapid battery charger according to claim 1, further comprising reference value changing means for changing the reference value in response to the comparison output.

4. The rapid battery charger according to claim 3, wherein when the comparison output represents that the voltage differential has exceeded the reference value, said reference level changing means changes the reference value to be compared with the voltage differential by said comparison means.

5. The rapid battery charger according to claim 4, wherein when the comparison output represents that the voltage differential has exceeded the reference value, said current level controlling means lowers the level of the current and said reference value changing means changes the reference value to be compared with the voltage differential by said comparison means.

6. The rapid battery charger according to claim 5, further comprising an initial current level setting means for setting an initial level of the current to be generated from said current source.

7. The rapid battery charger according to claim 6, further comprising an initial reference value setting means for setting an initial reference value to be initially compared with the voltage differential.

8. The rapid battery charger according to claim 7, wherein said current level controlling means changes the level of the current in three stages including a first current level, a second current level lower than the first current level and a third current level lower than the second current level, and said initial current level setting means sets the first current level, wherein said reference value changing means changes the reference value in three stages including a first reference value, a second reference value, and a third reference value, and said initial reference value setting means sets the first reference value, and wherein said current level changing means changes the first current level to the second level and concurrently said reference value changing means changes the first reference value to the second reference value when the comparison output represents that the voltage differential has exceeded the first reference value, and said current level changing means changes the second current level to the third level and concurrently said reference value changing means changes the second reference value to the third reference value when the comparison output represents that the voltage differential has exceeded the second reference value.

9. The rapid battery charger according to claim 8, further comprising termination means for terminating charging the battery when the comparison output represents that the voltage differential has exceeded the third reference value.

10. The rapid battery charger according to claim 9, further comprising alerting means for alerting that charging the battery has terminated when said terminating means has terminated charging the battery.

11. The rapid battery charger according to claim 10, wherein said alerting means comprises a buzzer.

12. The rapid battery charger according to claim 10, wherein said alerting means comprises a display.

13. A method of rapidly charging a rechargeable battery, comprising the steps of:
   (a) setting currant pulses to be applied to the battery, each of the current pulses having a level, an on duration from a rising edge to a falling edges, and an off duration from the falling edge to a subsequent rising edge of a subsequent current pulse;

(b) setting a reference value;

(c) applying the current pulses to the battery;

(d) detecting a first voltage across the battery at a first timing set immediately after the falling edge of each of the current pulses;

(e) detecting a second voltage across the battery at a second timing set after the first timing in the off duration of each of the current pulses;

(f) computing a difference between the first voltage and the second voltage and outputting a voltage differential representative of the difference therebetween;

(g) comparing the voltage differential with the reference value set in step (b) and outputting a comparison output;

(h) when the comparison output represents that the voltage differential has exceeded the reference value set in step (b), lowering the level of the current pulses and applying the lower level current pulses to the battery;

(i) changing the reference value set in step (b) to a predetermined different value; and (j) repeating steps (d) through (i) for a predetermined number of times and terminating charging the battery.

14. The method according to claim 13, wherein in step (j), steps (d) through (i) are repeated two times.

* * * * *